United States Patent
Heller (10) Patent No.: US 12,024,063 B2
(45) Date of Patent: Jul. 2, 2024

(54) METHOD FOR OPERATING A HYDRAULIC BRAKE SYSTEM IN A MOTOR VEHICLE WITH REGENERATIVE BRAKING FUNCTION, HYDRAULIC BRAKE SYSTEM AND METHOD FOR THE CONTROL THEREOF, COMPUTER PROGRAM PRODUCT, CONTROL UNIT AND MOTOR VEHICLE

(71) Applicant: ZF Active Safety GmbH, Koblenz (DE)

(72) Inventor: Frank Heller, Boppard (DE)

(73) Assignee: ZF Active Safety GmbH, Koblenz (DE)

( * ) Notice: Subject to any disclaimer, the term of this patent is extended or adjusted under 35 U.S.C. 154(b) by 212 days.

(21) Appl. No.: 17/218,227

(22) Filed: Mar. 31, 2021

(65) Prior Publication Data
US 2021/0300186 A1    Sep. 30, 2021

(30) Foreign Application Priority Data
Mar. 31, 2020  (DE) .......................... 102020108915.5

(51) Int. Cl.
*B60L 7/26* (2006.01)
*B60T 13/58* (2006.01)
*B60W 30/18* (2012.01)

(52) U.S. Cl.
CPC .............. *B60L 7/26* (2013.01); *B60T 13/586* (2013.01); *B60T 2270/602* (2013.01); *B60W 30/18127* (2013.01)

(58) Field of Classification Search
CPC .......... B60L 7/26; B60L 15/2009; B60T 1/10; B60T 8/4872; B60T 13/586;
(Continued)

(56) References Cited

U.S. PATENT DOCUMENTS 5,951,115 A * 9/1999 Sakai ...................... B60T 8/267
303/3
2004/0201273 A1* 10/2004 Kamiya .................... B60T 8/00
303/155

(Continued)

FOREIGN PATENT DOCUMENTS

DE    102019113754 A1 * 11/2020 ................ B60L 7/18
GB        2325285 A * 11/1998 .............. B60L 3/108
WO   WO-2011023329 A1 *  3/2011 .............. B60T 8/267

OTHER PUBLICATIONS

EPO machine translation of DE 102019113754 A1 (original DE document published Nov. 26, 2020) (Year: 2020).*

*Primary Examiner* — David A Testardi
(74) *Attorney, Agent, or Firm* — Kristin L. Murphy (57) ABSTRACT

The invention relates to a method for operating a hydraulic brake system (10) in a motor vehicle with regenerative braking function. In the method, if a generator braking force of an electric machine (50) is present or incipient, a hydraulic connection (80) between a brake cylinder (16) and a wheel brake (28) is opened before a hydraulic fluid is displaced in the direction of the wheel brake (28) by means of the brake cylinder (16). The invention furthermore relates to a hydraulic brake system (10) for a motor vehicle with regenerative braking function, and to a method for controlling a hydraulic brake system (10) with regenerative braking function. The invention also encompasses a computer program product, a control unit and a motor vehicle.

13 Claims, 2 Drawing Sheets

(58) Field of Classification Search
CPC ............ B60T 13/686; B60T 2270/604; B60W 10/188; B60W 30/18127
See application file for complete search history.

(56) References Cited

U.S. PATENT DOCUMENTS

| | | | |
|---|---|---|---|
| 2007/0013230 A1* | 1/2007 | Yang | B60L 7/26 303/155 |
| 2008/0255743 A1* | 10/2008 | Tanaka | B60T 8/4081 701/70 |
| 2011/0248560 A1* | 10/2011 | Vollert | B60T 8/4872 701/70 |
| 2013/0093237 A1* | 4/2013 | Dinkel | B60T 13/141 303/10 |
| 2013/0162009 A1* | 6/2013 | Mitts | B60L 7/26 303/3 |
| 2014/0152082 A1* | 6/2014 | Strengert | B60T 13/586 303/3 |
| 2014/0350814 A1* | 11/2014 | Schuler | B60W 10/188 701/70 |
| 2015/0222209 A1* | 8/2015 | Crisp | H02P 3/14 318/376 |
| 2015/0314686 A1* | 11/2015 | Knechtges | B60T 1/10 303/3 |
| 2015/0314763 A1* | 11/2015 | Marx | B60T 13/141 303/3 |
| 2015/0336552 A1* | 11/2015 | Marx | B60T 13/142 303/10 |
| 2015/0375726 A1* | 12/2015 | Roll | B60T 8/4081 303/3 |
| 2016/0264111 A1* | 9/2016 | Doi | B60T 8/267 |
| 2017/0240154 A1* | 8/2017 | Kashiwai | B60T 13/146 |
| 2018/0251131 A1* | 9/2018 | Doering | B60W 20/00 |
| 2019/0009762 A1* | 1/2019 | Schineller | B60T 8/348 |
| 2020/0339081 A1* | 10/2020 | Suzuki | B60W 30/18127 |
| 2020/0369158 A1* | 11/2020 | Marx | B60L 7/26 |
| 2020/0369159 A1* | 11/2020 | Marx | B60T 13/146 |
| 2020/0369160 A1* | 11/2020 | Marx | B60T 13/586 |
| 2020/0369248 A1* | 11/2020 | Marx | B60T 13/686 |
| 2020/0369249 A1* | 11/2020 | Marx | B60T 13/146 |
| 2021/0213836 A1* | 7/2021 | Jeon | B60T 8/176 |
| 2022/0203840 A1* | 6/2022 | Jeon | B60L 50/16 |

* cited by examiner

METHOD FOR OPERATING A HYDRAULIC BRAKE SYSTEM IN A MOTOR VEHICLE WITH REGENERATIVE BRAKING FUNCTION, HYDRAULIC BRAKE SYSTEM AND METHOD FOR THE CONTROL THEREOF, COMPUTER PROGRAM PRODUCT, CONTROL UNIT AND MOTOR VEHICLE

RELATED APPLICATIONS

The present invention claims priority from 102020108915.5, filed 31 Mar. 2020, the entirety of which is incorporated herein by reference.

TECHNICAL FIELD

The invention relates to a method for operating a hydraulic brake system in a motor vehicle with regenerative braking function. The invention furthermore relates to a hydraulic brake system for a motor vehicle with regenerative braking function, and to a method for controlling the hydraulic brake system. The invention furthermore relates to a computer program product, a control unit and a motor vehicle.

BACKGROUND

Hydraulic brake systems are used for example in motor vehicles and serve primarily as a service brake for the motor vehicle. A braking operation is commonly performed by virtue of the driver of the motor vehicle actuating a brake pedal and a hydraulic fluid thus being displaced from a brake cylinder to at least one wheel brake, such that, at the wheel brake, a braking force prevails which acts on an associated vehicle wheel. This hydraulic braking force effected by means of the hydraulic fluid commonly corresponds to a braking force demand which is imparted by the driver through the actuation of the brake pedal.

Modern motor vehicles with a hydraulic brake system increasingly have a regenerative braking function. Such a braking function is normally based on a recuperation process and is commonly implemented in the following manner: In the presence of a braking force demand input through actuation of the brake pedal, an electric machine operating in the generator mode is at least temporarily driven by the kinetic energy of the motor vehicle and supplies electrical energy, which can be utilized for example for charging an electrical energy store of the motor vehicle. The electric machine used for this purpose is commonly the electric machine which forms an electric drive for the motor vehicle, for example as a main drive or secondary drive, and which is then operated as a generator during the course of an occurring regenerative braking process.

The generator operation of the electric machine is however associated with a drag torque which originates from the electric machine and which exerts a braking action on the motor vehicle. This braking force caused by the electric machine, hereinafter also referred to as generator braking force, must be taken into consideration in the dimensioning of the hydraulic braking force to be applied in order to meet a braking force demand input by the driver through actuation of the brake pedal. One possible concept in this regard is described in WO 2014/082885 A1.

Said document discloses a method for controlling a hydraulic brake system during a regenerative braking process. In the method, at least one volume fraction of a hydraulic fluid which is displaced from a brake cylinder in the direction of a wheel brake is temporarily stored in a hydraulic accumulator via a pressure dissipation valve. It is made possible in this way that, in the case of a predefined braking force demand and an associated displacement of the hydraulic fluid, a hydraulic braking force action on the wheel brake is omitted at least to the extent that the electric machine can be incorporated for the purposes of generating electrical energy and, despite the generator braking force originating from the electric machine, the resulting overall braking force corresponds to the input braking force demand.

It is an object of the invention to propose at least one possibility for improving the previous concept of a regenerative braking operation.

The object is achieved by means of a method for operating a hydraulic brake system having the features of claim 1. The object is furthermore achieved by means of a hydraulic brake system having the features of claim 11 and by means of a method for controlling a hydraulic brake system. Furthermore, to achieve the object, a computer program product, a control unit and a motor vehicle are proposed. Advantageous embodiments and/or refinements and/or aspects of the invention will emerge from the subclaims, from the following description and from the figures.

One embodiment of a method for operating a hydraulic brake system in a motor vehicle with regenerative braking function comprises the step that, if a generator braking force of an electric machine is present or incipient, that is to say the electric machine is in a generator mode or a generator mode is incipient, a hydraulic connection between a brake cylinder and a wheel brake is opened before a hydraulic fluid is or has been displaced in the direction of the wheel brake by means of the brake cylinder. In this way, the hydraulic connection between the brake cylinder and the wheel brake has already been opened, in particular at least partially or completely opened, when a displacement of the hydraulic fluid in the direction of the wheel brake occurs, for example owing to an actuation of the brake cylinder.

The opening of the hydraulic connection is to be understood in particular to mean that the hydraulic connection between the brake cylinder and the wheel brake is opened in order to allow the hydraulic fluid to flow out of the hydraulic connection. For example, in the opening process, an opening is opened up or generated in the hydraulic connection, via which opening the hydraulic fluid can flow out.

By means of the early opening of the hydraulic connection, a measure is implemented for counteracting undesired contact of a friction lining of the wheel brake against a counterpart friction surface. Such undesired contact is promoted for example if the hydraulic connection between the brake cylinder and the wheel brake is opened only when a displacement of the hydraulic fluid by means of the wheel brake has already commenced. This is because the movement of the hydraulic fluid that has already been performed can result in a hydraulic pressure pulse or pressure peak in the wheel brake, of such a magnitude that the friction lining is moved in the direction of the counterpart friction surface, and makes contact therewith, as a result. Owing to the action of internal friction in the wheel brake, the friction lining then does not perform a return movement of its own accord. The result is an undesired rubbing moment which is caused by the contact of the friction lining with the counterpart friction surface, because this reduces the efficiency of the generator mode of the electric machine.

In one embodiment, it is provided that the above-described opening of the hydraulic connection between the brake cylinder and the wheel brake is performed under an additional condition which takes into consideration the accelerator pedal of the motor vehicle. For example, the present state of actuation of the accelerator pedal is taken into consideration. In addition or alternatively, a present change in the pedal position or actuation position of the accelerator pedal may be taken into consideration. This measure promotes the attainment of the highest possible level of operational safety for the method. This means in particular that it is sought to open the hydraulic connection only with regard to a regenerative braking process of the motor vehicle, and to otherwise leave the hydraulic connection closed, or close the hydraulic connection, in order to then be able to provide a hydraulic braking force when required and/or for safety.

This measure furthermore promotes early regenerative braking with the hydraulic connection between the brake cylinder and the wheel brake already open, such that the above-described pressure pulse or pressure peak in the wheel brake is counteracted during the early regenerative braking too. This is because information regarding a desired motor power for the drive machine of the motor vehicle can be obtained on the basis of the accelerator pedal, for example by virtue of the pedal position of the accelerator pedal, in particular the present pedal position of the accelerator pedal, and/or the change in the pedal position of the accelerator pedal, in particular the present change in the pedal position of the accelerator pedal, being taken into consideration. By means of this information provided in conjunction with the accelerator pedal, it is made possible for the hydraulic connection between the brake cylinder and the wheel brake to be opened so early that, even in the case of an early actuation of the brake cylinder or in the case of an early displacement of the hydraulic fluid in the direction of the wheel brake, the hydraulic connection is already open.

The additional condition may relate to a present change in the pedal position of the accelerator pedal. For example, if a generator braking force of the electric machine is present or incipient, and if the accelerator pedal of the motor vehicle has been or is changed from an actuation position in the direction of a rest position, the hydraulic connection between the brake cylinder and the wheel brake is opened before the above-described hydraulic fluid or a hydraulic fluid is displaced in the direction of the wheel brake by means of the brake cylinder. In this case, the present change in the pedal position of the accelerator pedal relates to the change of the accelerator pedal from the one actuation position in the direction of the rest position.

The expression "actuation position" is to be understood in particular to mean a pedal position in which an actuation of the accelerator pedal is performed. The "actuation position" is for example also to be understood to mean a position in which acceleration is performed. The expression "rest position" is to be understood in particular to mean a pedal position in which no actuation of the accelerator pedal takes place.

The additional condition may furthermore relate to a state of the accelerator pedal in which the accelerator pedal is or has been released. For example, if a generator braking force of the electric machine is present or incipient, and if the accelerator pedal of the motor vehicle has been or is released, the hydraulic connection between the brake cylinder and the wheel brake is opened before the above-described hydraulic fluid or a hydraulic fluid is displaced in the direction of the wheel brake by means of the brake cylinder.

The above-described early regenerative braking with the hydraulic connection between the brake cylinder and the wheel brake open can be implemented for example by virtue of the hydraulic connection being immediately opened, for example, as soon as the accelerator pedal has been released and before a hydraulic fluid is displaced in the direction of the wheel brake by means of the brake cylinder, and in particular if a generator braking force of the electric machine is present.

In addition or as an alternative, the accelerator pedal may be used to evaluate and/or identify whether a generator braking force is present or incipient. This measure is expedient for example for the case in which the electric machine that generates the generator braking force is also utilized as a drive of the motor vehicle. When the electric machine acts as a drive, it is in a motor mode. By contrast, the generator braking force is effected for example by means of a generator mode of the electric machine.

In the motor mode, the open-loop and/or closed-loop control of the motor power of the electric machine is performed by means of the accelerator pedal, for example by virtue of the accelerator pedal being actuated. A change in the pedal position of the accelerator pedal from an actuation position in the direction of the rest position can thus be evaluated as meaning that the generator mode of the electric machine and thus the generator braking force is incipient. Also, in a further embodiment, it may be provided that the electric machine is switched over from the motor mode into the generator mode if the accelerator pedal of the motor vehicle has been or is released.

In a further embodiment, it is provided that the above-described opening of the hydraulic connection between the brake cylinder and the wheel brake is performed under an additional condition which takes into consideration a brake pedal assigned to the brake cylinder. For example, the present state of actuation of the brake pedal is taken into consideration. In addition or alternatively, a present change in the pedal position or actuation position of the brake pedal may be taken into consideration. This measure also promotes the attainment of the highest possible level of operational safety for the method. This means in particular that it is sought to open the hydraulic connection only with regard to a regenerative braking process of the motor vehicle, and to otherwise leave the hydraulic connection closed, or close the hydraulic connection, in order to then be able to provide a hydraulic braking force when required and/or for safety.

The additional condition may relate to the present state of actuation of the brake pedal. For example, if a generator braking force of the electric machine is present or incipient, and if the brake pedal has been or is actuated, the hydraulic connection between the brake cylinder and the wheel brake is opened before the above-described hydraulic fluid or a hydraulic fluid is displaced in the direction of the wheel brake by means of the brake cylinder. As a result, the opening of the hydraulic connection is performed for example in the time after an actuation of the brake pedal has been detected or identified and before the brake cylinder is actuated and thus the hydraulic fluid is displaced. It is basically additionally also possible to use the condition that the accelerator pedal of the motor vehicle has been changed from an actuation position or from the one above-described actuation position in the direction of the rest position and/or that the accelerator pedal has been released.

The hydraulic connection between the brake cylinder and the wheel brake should preferably be closed again after the opening process in order to be able to provide a hydraulic braking force when required and/or for safety. For example, it is provided that, if a braking force demand, in particular a present braking force demand, is higher than the generator braking force of the electric machine, the hydraulic connection between the brake cylinder and the wheel brake is closed. As a result of the closure of the hydraulic connection, the wheel brake can impart a hydraulic braking force. It is thus possible in this way for an overall braking force to be generated which is of such a magnitude that the present braking force demand is reliably covered and thus the desired braking operation is also actually performed.

For example, it is furthermore provided that, if no actuation of the brake cylinder occurs over a predetermined waiting period, the hydraulic connection between the brake cylinder and the wheel brake is closed. For example, it is furthermore provided that, if a standstill state of the motor vehicle has been identified, the hydraulic connection between the brake cylinder and the wheel brake is closed. In these cases, too, for the sake of safety, the hydraulic connection is closed, such that the wheel brake can then impart a hydraulic braking force.

In a further embodiment, it is provided that the hydraulic connection between the brake cylinder and the wheel brake is closed, and furthermore a pump is activated, in order to return a volume fraction of the hydraulic fluid, which has flowed out via the open hydraulic connection, back into the hydraulic connection. It is expedient for these steps to be executed if the brake pedal assigned to the brake cylinder is actuated with a speed higher than a predefined speed, in particular a predefined maximum speed. This counteracts a situation in which an undesired and possibly safety-critical lengthening of the pedal travel of the brake pedal occurs owing to an actuation of the brake pedal with very high speed. The speed of actuation of the brake pedal is detected for example by means of a pedal travel sensor.

An underlying hydraulic brake system, which is for example suitable for a motor vehicle with regenerative braking function and for example for carrying out the operating method described above, comprises a brake cylinder and a wheel brake which have a hydraulic connection to one another, wherein the brake cylinder is configured to displace a hydraulic fluid in the direction of the wheel brake, and the wheel brake is configured to impart a hydraulic braking force by means of the hydraulic fluid. The hydraulic brake system furthermore comprises an opening device for opening the hydraulic connection between the brake cylinder and the wheel brake. The hydraulic brake system furthermore comprises a control unit for activating the opening device.

In the following embodiments, by means of the provided refinement of the control unit, possibilities are proposed for carrying out the above-described method and thus achieving the advantages described with regard to the method. For example, in one embodiment, the control unit is configured to utilize a signal with information regarding a presence or onset of a generator braking force of an electric machine. For example, the control unit is furthermore configured such that, if a generator braking force of the electric machine is present or incipient, said control unit activates the opening device so as to open the hydraulic connection before the hydraulic fluid is displaced in the direction of the wheel brake.

In a further embodiment, the control unit is configured to utilize a signal with information regarding a present state of actuation of the accelerator pedal of the motor vehicle. In particular, the control unit is configured such that, if a generator braking force of the electric machine is present or incipient, and if the accelerator pedal of the motor vehicle has been changed from an actuation position in the direction of a rest position and/or has been released, said control unit activates the opening device so as to open the hydraulic connection before the hydraulic fluid is displaced in the direction of the wheel brake. In particular, the control unit is configured such that, if or as soon as the accelerator pedal has been released, said control unit switches over the electric machine from a motor mode into a generator mode which effects the generator braking force.

In a further embodiment, the control unit is configured to utilize a signal with information regarding a present state of actuation of a brake pedal assigned to the brake cylinder. In particular, the control unit is configured such that, if a generator braking force of the electric machine is present or incipient, and if the brake pedal has been actuated, said control unit activates the opening device so as to open the hydraulic connection before the hydraulic fluid is displaced in the direction of the wheel brake.

In a further embodiment, the control unit is configured to utilize a signal with information regarding a braking force demand, in particular a present braking force demand, for example to compare the braking force demand with the generator braking force, in particular the present generator braking force of the electric machine. In particular, the control unit is configured such that, if the braking force demand or the present braking force demand is higher than the generator braking force or the present generator braking force, said control unit activates the opening device so as to close.

In a further embodiment, the control unit is configured to utilize a signal with information regarding an actuation of the brake cylinder. In particular, the control unit is configured such that, if no actuation of the brake cylinder occurs over a predetermined waiting period, said control unit activates the opening device so as to close.

In a further embodiment, the control unit is configured to utilize a signal with information regarding the speed, in particular the present speed of the motor vehicle. In particular, the control unit is configured such that, if a standstill state of the motor vehicle has been identified, said control unit activates the opening device so as to close.

In a further embodiment, the brake system comprises a pump and an accumulator, which are fluidically assigned to a return line. In particular, the return line is hydraulically connected to the opening device and, in particular, in an open state of the opening device, there is a hydraulic passage to the hydraulic connection between the brake cylinder and the wheel brake. The accumulator is configured to store at least one volume fraction of the hydraulic fluid. The pump is configured to convey at least one volume fraction of the hydraulic fluid.

In particular, the control unit is configured such that, if the brake pedal for the brake cylinder is actuated with a speed higher than a predefined speed, said control unit activates the opening device so as to close and activates the pump so as to impart a conveying action in order to return a volume fraction of the hydraulic fluid, which has flowed out via the open opening device, via the return line back into the hydraulic connection between the brake cylinder and the wheel brake.

The opening device may be or comprise a pressure dissipation valve which is for example a constituent part of an anti-lock braking system and/or of a driving dynamics control system. Also, the pump and/or the accumulator may be a constituent part of the anti-lock braking system or of the driving dynamics control system.

In order to carry out the operating method described above, a method for controlling the above-described hydraulic brake system in a motor vehicle with regenerative braking function is proposed. In one embodiment, said control method comprises the step that, if a generator braking force of the electric machine is present or incipient, the opening device is activated by means of the control unit so as to open the hydraulic connection before the hydraulic fluid is displaced in the direction of the wheel brake.

In particular, it is provided that, if a generator braking force of the electric machine is present or incipient, and if the accelerator pedal of the motor vehicle has been changed from an actuation position in the direction of a rest position and/or has been released, the opening device is activated by means of the control unit so as to open the hydraulic connection before the hydraulic fluid is displaced in the direction of the wheel brake.

In particular, it is furthermore provided that, if the accelerator pedal of the motor vehicle has been released, the electric machine is switched over by means of the control unit from a motor mode into a generator mode which effects the generator braking force.

In particular, it is furthermore provided that, if a braking force demand or present braking force demand is higher than the generator braking force or present generator braking force of the electric machine, or if no actuation of the brake cylinder occurs over a predetermined waiting period, or if a standstill state of the motor vehicle has been identified, the opening device is activated by means of the control unit so as to close.

A further embodiment comprises the steps that, if the brake pedal for the brake cylinder is actuated with a speed higher than a predefined speed, the opening device is activated so as to close, and the pump is actuated so as to impart a conveying action, by means of the control unit in order to return a volume fraction of the hydraulic fluid, which has flowed out via the open opening device, back into the hydraulic connection between the brake cylinder and the wheel brake.

According to one aspect, the invention furthermore relates to a computer program product having program code, which is stored on a computer-readable medium, for carrying out an embodiment of the above-described method for controlling a hydraulic brake system.

According to a further aspect, the invention relates to a control unit, in particular for the above-described hydraulic brake system, comprising the above-described computer program product.

According to a further aspect of the invention, a motor vehicle having the above-described hydraulic brake system and/or the above-described computer program product and/or the above-described control unit is provided, wherein the motor vehicle is in particular designed to carry out the above-described method for operating a hydraulic brake system.

According to one embodiment, the motor vehicle comprises at least one vehicle wheel and at least one electric machine connected in terms of drive to the vehicle, which electric machine is configured to be utilized as a generator during a braking process of the motor vehicle. The electric machine may be the electric machine described above.

In particular, the electric machine is configured to be present only in a generator mode or to be switched, in particular manually or automatically switched, into a generator mode upon an onset of a braking process of the motor vehicle, in particular upon an onset of a displacement of the hydraulic fluid by means of the brake cylinder. For example, the electric machine is an electric drive of the motor vehicle, which, for example as a main drive or secondary drive, acts with driving action on the at least one vehicle wheel and, during a braking process of the motor vehicle, is utilized as a generator in order, for example, to charge an electrical energy store of the motor vehicle.

The expression "regenerative braking function" is to be understood in the present description in particular to mean a manner of functioning during a braking process in the case of which, by means of at least one electric machine operated as a generator, kinetic energy is converted into electrical energy and this simultaneously results in a braking action, in particular a braking action which brakes the motor vehicle, which in the present description is also referred to as generator braking force. This braking action is effected for example by a drag torque originating from the electric machine. For example, the kinetic energy results from the movement of the motor vehicle and/or from the rotational movement of the vehicle wheels. The electrical energy is preferably at least partially reused. For example, at least a part of the electrical energy is stored in an electrical energy store and is then available for use, for example for driving the motor vehicle and/or for the on-board electrical system of the motor vehicle. The braking process considered here is also referred to in the present description as regenerative braking process.

In the present description, a hydraulic braking action effected by the wheel brake is referred to by way of example as hydraulic braking force. This is to be understood in particular to mean the braking action of the wheel brake in relation to the vehicle wheel which is or can be assigned to the wheel brake. If multiple such wheel brakes are provided, each of these wheel brakes can impart a hydraulic braking force, such that this results in a hydraulic braking force, that is to say a hydraulic overall braking force, which is made up of the hydraulic individual braking forces.

During the regenerative braking process, it is for example the case that a braking force is present which is made up of the hydraulic braking force and the generator braking force effected by the electrical machine, wherein the generator braking force relates for example to the vehicle wheel or vehicle axle, or to the motor vehicle with the vehicle wheel, to which the wheel brake is or can be assigned. In particular, the braking force is distinct from a braking force demand. In the present description, the term "braking force demand" is to be understood in particular to mean a measure for a desired braking action, which is also referred to generally as "braking demand".

SUMMARY

In the present description, the expression "wheel brake" is to be understood in particular to mean a friction brake, such as for example a disk brake or a drum brake. In particular, the wheel brake is configured to be utilized as a service brake. For example, the wheel brake is assigned to a vehicle wheel or is configured to be assigned to a vehicle wheel.

In the present description, the expression "brake cylinder" is to be understood in particular to mean a device which generates fluid pressure. The brake cylinder may comprise a pressure piston which is for example held displaceably in a cylinder and which, by means of a displacement movement of the pressure piston relative to the cylinder, effects a displacement of a hydraulic fluid or of a hydraulic fluid volume. The expression "brake cylinder" in particular also encompasses a conveying pump or similar conveying device as a device which generates fluid pressure. The brake cylinder may be a master brake cylinder. For example, the brake cylinder is a master brake cylinder such as is common in conventional hydraulic brake systems. For example, the brake cylinder comprises a reservoir and/or a replenishment vessel for the hydraulic fluid.

In the present description, the expression "brake pedal" is to be understood in particular to mean an actuating device for actuating the brake cylinder. In particular, the brake cylinder interacts with an actuating device, or the brake cylinder is configured to interact with an actuating device. In particular, an actuation of the actuating device has the effect, at the brake cylinder, that a displacement of the hydraulic fluid occurs. For example, an actuation of the brake cylinder is realized mechanically, in particular purely mechanically, or electrically or electromechanically.

For example, the actuating device comprises a foot-operated pedal or a hand-operated lever which acts, for example via a piston rod, on the brake cylinder so as to generate fluid pressure. In addition or alternatively, the actuating device or the brake pedal may comprise an electric machine, in particular an electric motor, wherein an output shaft of the electric machine is coupled in terms of drive to the brake cylinder in order to thereby actuate the brake cylinder. The actuating device may be actuated manually for example by the driver of the motor vehicle or automatically or in self-acting fashion by means of a vehicle controller.

The term "accelerator pedal" is to be understood in the present description in particular to mean a control device for the open-loop and/or closed-loop control of the motor power of the drive machine of a motor vehicle. For example, the control device is configured to electronically and/or mechanically activate the drive machine. For example, the control device is furthermore configured to be mechanically and/or electronically actuated. The accelerator pedal is for example a foot-operated pedal or a hand-operated lever.

The "onset of a generator braking force of the electric machine" is to be understood in the present description in particular to mean that the electric machine is to be switched into the generator mode, for example by virtue of an electrical energization of the electric machine being withdrawn or switched off. In particular, the electrical energization of the electric machine is withdrawn or switched off in a manner dependent on an actuation of an actuating device which is coupled in terms of actuation to the brake cylinder. For example, the electrical energization of the electric machine is withdrawn or switched off in a manner dependent on an actuation of the accelerator pedal and/or of the brake pedal of the motor vehicle. The actuation of the actuating device or of the accelerator pedal and/or of the brake pedal may be performed by the driver of the motor vehicle or by a vehicle controller, for example an automated driving system or autopilot or a driver assistance system or the like.

The expression "vehicle controller" is to be understood in the present description in particular to mean a control system which effects an actuation of the brake cylinder independently of an actuation of the brake pedal performed by the driver. Such a control system, which may also be referred to as automatic vehicle controller, may be a driver assistance system. The driver assistance system is for example a distance-regulating cruise control system (ACC; Adaptive Cruise Control), which performs radar-based closed-loop control of the distance to a vehicle traveling ahead by means of braking and engine interventions, or a driving dynamics regulation system (ESC; Electronic Stability Control), which seeks, through targeted braking of individual wheels of the motor vehicle, to prevent skidding of the motor vehicle in a limit range during cornering both in the case of oversteering and in the case of understeering of the motor vehicle, and thus ensure that the driver has control over the motor vehicle.

In the present description, the expression "pump" is to be understood in particular to mean a conveying device for conveying hydraulic fluid. For example, the pump is a rotary pump, in particular a radial piston pump or an axial piston pump. In particular, the rotary pump comprises at least one, preferably multiple, for example two to six, working piston(s), which perform(s) or can perform a reciprocating movement for the purposes of conveying the hydraulic fluid. For example, the pump comprises an electric machine, for example an electric motor, which serves for driving the pump. The electric machine is for example configured to receive electrical control signals and output corresponding control signals to the pump.

The expression "accumulator" is to be understood in the present description in particular to mean a hydro accumulator or hydraulic accumulator which is for example configured to store the hydraulic fluid under pressure. That volume fraction of the hydraulic fluid which is conducted to the accumulator is thus received therein counter to a resetting force of the accumulator. The accumulator may be designed such that a gas or a spring element is compressed during a process of filling with the hydraulic fluid. For example, the accumulator is a buffer accumulator which is configured to temporarily buffer-store the at least one volume fraction of the hydraulic fluid.

In the present description, the expression "control unit" is to be understood in particular to mean an electronic unit of an item of computer hardware which, in conjunction with the hydraulic brake system and for example an electric machine utilized during regenerative braking, controls particular processes and/or sequences. The control unit may have a digital processing unit, which comprises for example a microprocessor unit (CPU). The CPU may be connected in data-exchanging and/or signal-exchanging fashion to a memory system and/or bus system. The control unit may have one or more programs or program modules. The digital processing unit may be designed such that commands that are implemented as a program stored in a memory system are executed, input signals are received from a data bus system, and/or output signals are output to a data bus system. A memory system may have one or more, in particular different, memory media. The memory media may in particular be optical, magnetic, solid-state memory media and/or other, preferably nonvolatile memory media.

BRIEF DESCRIPTION OF THE DRAWINGS

Further details and features of the invention will emerge from the following description of at least one exemplary embodiment on the basis of the drawings. In the drawing.

DETAILED DESCRIPTION

Figure 1:
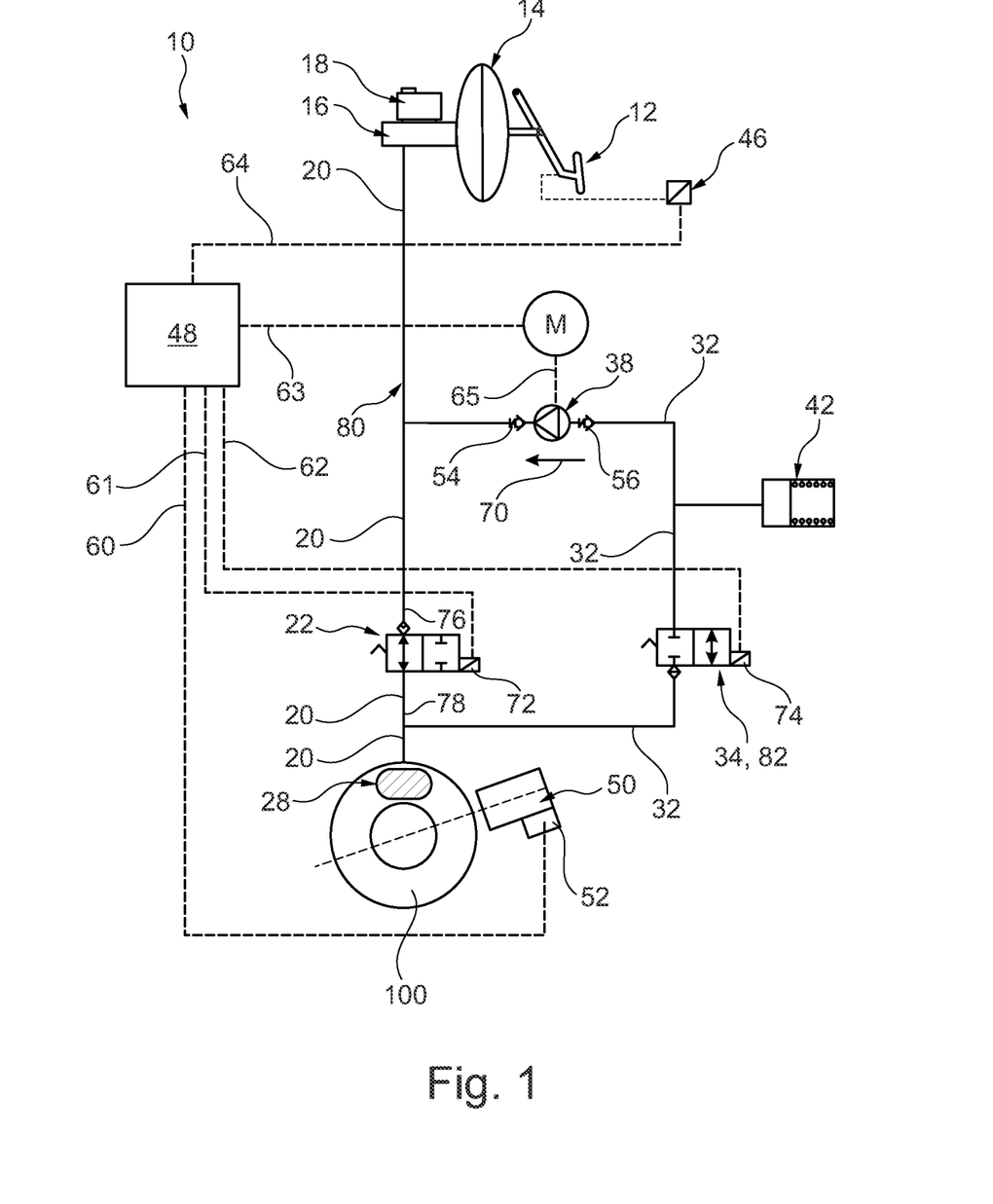
FIG. 1 shows a possible embodiment of a hydraulic brake system, which is suitable for carrying out a regenerative braking process, in a schematic illustration.

FIG. 1 shows a possible embodiment of a hydraulic brake system 10 which is used for example in a motor vehicle. In FIG. 1, the hydraulic brake system 10 is illustrated by way of example in conjunction with one vehicle wheel 100. The hydraulic brake system 10 is configured to be able to perform a regenerative braking process. In the regenerative braking process, the kinetic energy of the motor vehicle is utilized in order to drive an electric machine 50 in generator mode and thereby generate electrical energy.

The electrical energy can be utilized for example to charge an electrical energy store of the motor vehicle. By way of example, in FIG. 1, the electric machine 50 is assigned to the vehicle wheel 100 in order to illustrate that the electric machine 50 is driven by the movement of the vehicle, that is to say by the rotation of the vehicle wheel 100. The electric machine 50 is preferably a constituent part of an electric drive of the motor vehicle, which serves for example for driving the vehicle wheel 100. During a regenerative braking process, said electric drive is utilized as a generator.

The hydraulic brake system 10 comprises, for example, a brake cylinder 16 and a wheel brake 28, which have a hydraulic connection 80 to one another. The brake cylinder 16 is configured to displace a hydraulic fluid in the direction of the wheel brake 28 via the hydraulic connection 80. The wheel brake 28 is configured to exert a braking force, for example in the form of a friction force, on the vehicle wheel 100 by means of the hydraulic fluid. The brake cylinder 16 and the wheel brake are preferably hydraulically connected to one another via a brake line. The brake line preferably serves as a feed line 20, for example for feeding the hydraulic fluid to the wheel brake 28.

The hydraulic brake system 10 furthermore comprises for example an opening device 82 for opening the hydraulic connection 80 between the brake cylinder 16 and the wheel brake 28. By means of the opening device 82, the hydraulic connection 80 can be opened as required, for example in order to counteract, or entirely prevent, a build-up of a hydraulic brake pressure in the wheel brake 28. This is because, in this case, in the event of an actuation of the brake cylinder 16, the hydraulic fluid that is thereby set in motion will at least partially escape from the hydraulic connection 80 for example via an opening formed or opened up by means of the opening device 82. The opening device 82 is preferably furthermore configured to close the hydraulic connection 80. When the hydraulic connection 80 is in a closed state, in the event of an actuation of the brake cylinder 16, the hydraulic fluid that is thereby set in motion will, preferably in its entirety, pass into the wheel brake 28, and the desired hydraulic brake pressure will build up in the wheel brake 28.

The hydraulic brake system 10 is preferably assigned a brake pedal 12, by means of which the brake cylinder 16 is to be actuated. The brake cylinder 16 is preferably assigned a reservoir 18 for the purposes of storing hydraulic fluid for the hydraulic brake system 10 in said reservoir. The reservoir 18 may have an inlet opening in order to be refilled or filled via said inlet opening. To boost an actuating force input by means of the brake pedal 12, for example by a driver of the motor vehicle, a brake force booster 14 may be provided. The brake force booster 14 preferably boosts the actuating force in a known manner in accordance with a pneumatic, electrohydraulic or electromechanical principle. In order, for automatic vehicle control, to actuate the brake cylinder 16 independently of an actuation of the brake pedal 12 by the driver, it is also possible for an electrically controlled brake force booster (EBB; Electronic Brake Booster) to be provided.

The hydraulic brake system 10 preferably furthermore comprises an isolation valve 22 which is fluidically assigned to the feed line 20 and which is configured to close the feed line 20. For example, it is the intention in this way for the wheel brake 28 to be able to be at least partially or entirely hydraulically isolated from the brake cylinder 16. The isolation valve 22 is preferably provided for adjustment between a closed position and an open position in order to close or shut off, in particular to entirely or at least partially close or shut off, the feed line 20. Preferably, in the closed position of the isolation valve 22, the feed line 20 is shut off, in particular fully shut off or at least largely or substantially shut off, and, in the open position, the feed line 20 is open, in particular substantially open or fully open.

Preferably, the hydraulic brake system 10 furthermore comprises a return line 32 which serves for returning at least one volume fraction of the hydraulic fluid from a region 78 positioned downstream of the isolation valve 22 into a region 76 positioned upstream of the isolation valve 22. For example, the return line 32 is connected in terms of flow by means of one end to the feed line 20 in a region between the isolation valve 22 and the wheel brake 28. Preferably, the return line 32 is connected in terms of flow by means of another end to the feed line 20 in a region between the isolation valve 22 and the brake cylinder 16. In this way, at least one volume fraction of the hydraulic fluid can be returned from the wheel brake 28 into the feed line 20, bypassing the isolation valve 22.

In the present description, the "region positioned downstream" is to be understood in particular to mean that receiving volume of the brake system 10 for receiving hydraulic fluid which is positioned downstream of the isolation valve 22 as viewed in the flow direction with respect to the feed line 20, that is to say in the direction from the brake cylinder 16 to the wheel brake 28. For example, the region 78 positioned downstream comprises a hydraulic receiving volume of the feed line 20 which is positioned downstream of the isolation valve 22, and/or comprises a hydraulic receiving volume of the wheel brake 28.

In the present description, the "region positioned upstream" is to be understood in particular to mean that receiving volume of the brake system 10 for receiving hydraulic fluid which is positioned upstream of the isolation valve 22 as viewed in the flow direction with respect to the feed line 20, that is to say in the direction from the brake cylinder 16 to the wheel brake 28. For example, the region 76 positioned upstream comprises a hydraulic receiving volume of the feed line 20 which is positioned upstream of the isolation valve 22 and/or comprises a hydraulic receiving volume of the brake cylinder 16 and/or for example of the reservoir 18 for the hydraulic fluid.

Preferably, the return line 32 is fluidically assigned a pump 38 and an accumulator 42. The pump 38 is configured to convey at least one volume fraction of the hydraulic fluid, in particular in a return direction 70. Preferably, by means of a conveying action of the pump 38 in the return direction 70, the at least one volume fraction of the hydraulic fluid is conveyed in the direction of the region 76 positioned upstream. Preferably, the conveyance in the return direction 70 is ensured by virtue of at least one, preferably two check valves 54, 56 being provided, and the pump 38 being arranged for example in between. The accumulator 42 is configured to store at least one volume fraction of the hydraulic fluid, in particular to store the same under pressure, in particular to buffer-store the same.

The return line 32 is preferably furthermore fluidically assigned a valve, in particular a shut-off valve. As viewed in the return direction 70, the valve is preferably positioned upstream of the accumulator 42 and possibly of the pump 38. For example, the valve is a constituent part of an anti-lock braking system and/or of a driving dynamics control system, and serves for the dissipation of the hydraulic brake pressure in the wheel brake 28. The valve is therefore also referred to below as pressure dissipation valve 34. The valve, in particular the pressure dissipation valve 34, is preferably utilized to form the opening device 82. For example, the valve or the pressure dissipation valve 34 is a constituent part of the opening device 82 or forms the opening device 82.

Preferably, the pressure dissipation valve 34 is configured to open and close the return line 32. The pressure dissipation valve 34 is preferably provided for adjustment between a closed position and an open position in order to open, in particular entirely or at least partially open, the return line 32. Preferably, in the open position of the pressure dissipation valve 34, the return line 32 is open, in particular at least partially open or fully open, and, in the closed position, the return line 32 is closed or shut off, in particular entirely shut off or at least largely or substantially shut off. Preferably, as viewed in the return direction 70 of the hydraulic fluid, the pressure dissipation valve 34, the pump 38 and the accumulator 42 are arranged in the sequence in which the pressure dissipation valve 34 comes first, and is followed either by the pump 38 or the accumulator 42. By opening the return line 32, the accumulator 42 is thus filled with the returned volume fraction of the hydraulic fluid.

Preferably, the hydraulic brake system 10 furthermore comprises a control unit 48, in particular an electrical control unit, for activating the isolation valve 22 and/or the opening device 82 and/or the pressure dissipation valve 34 and/or the pump 38. For example, for this purpose, the control unit 48 is connected in signal-exchanging fashion to the isolation valve 22 and/or to the opening device 82 and/or to the pressure dissipation valve 34 and/or to the pump 38 via a corresponding signal line 61 or 62 or 63 respectively, in particular electrical signal line. Preferably, the isolation valve 22 and/or the opening device 82 and/or the pressure dissipation valve 34 and/or the pump 38 has in each case one electrical receiver unit in order to process the control signals transmitted by the control unit 48 and initiate or perform a corresponding actuation of the isolation valve 22 or of the opening device 82 or of the pressure dissipation valve 34 or of the pump 38 respectively.

For example, for this purpose, the pump 38 may have a corresponding actuating device, such as for example an electric drive motor M, which is activated by the control line 63 and which acts on the pump 38, in particular on a working cylinder of the pump 38, via a mechanical and/or hydraulic and/or electromagnetic actuation connection 65. Preferably, both control signals and state signals, for example signals with information items regarding monitored or detected parameters, are to be transmitted via the signal lines 61, 62, 63.

It is for example furthermore possible for the isolation valve 22 to be assigned an actuator 72, and/or for the opening device 82, in particular the pressure dissipation valve 34, to be assigned an actuator 74. By means of the respective actuator 72 or 74, the associated isolation valve 22 or the associated opening device 82 or the associated pressure dissipation valve 34 is actuated, for example mechanically actuated. The actuator 72 or 74 itself may be activated by means of the respective control line 61 or 62 respectively. The signals transmitted via the signal lines 61, 62, 63 may be electrical current signals and/or electrical voltage signals. The electrical signals are for example pulse-width-modulated (PWM signals).

The control unit 48 is preferably connected in signal-exchanging fashion to the electric machine 50 for example via a signal line 60, in order to transmit control signals from the control unit 48 to the electric machine 50 and/or conversely in order to transmit control signals or signals containing information items regarding an operating state of the electric machine 50, for example, to the control unit 48. For this purpose, the electric machine 50 may have a control unit 52 which communicates via the signal line 60 with the control unit 48*t* and which activates, in particular directly activates, the electric machine 50.

Preferably, the control unit 48 is furthermore connected in signal-exchanging fashion via a signal line 64 to a sensor element assigned to the brake pedal 12, in particular a pedal travel sensor 46. The pedal travel sensor 46 serves for detecting a pedal travel of the brake pedal 12. Via the signal connection between the pedal travel sensor 46 and the control unit 48, the control unit 48 can take into consideration information items relating to the pedal travel.

The control unit 48 is preferably configured to utilize a signal with at least information regarding a presence or an onset of an actuation of the brake cylinder 16. The control unit 48 is preferably configured to utilize a signal with at least information regarding a presence or an onset of a generator braking force originating from the electric machine 50. The control unit 48 is for example configured such that, in the presence or upon an onset of an actuation of the brake cylinder 16 and in particular in the presence or upon an onset of a generator braking force originating from the electric machine 50, said control unit activates the opening device 82 for opening the hydraulic connection 80, in particular activates the pressure dissipation valve 34 for adjustment in the direction away from a closed state, for example for adjustment in the direction of an open position. Preferably, the opening device 82 or the pressure dissipation valve 34 is activated for adjustment in the direction away from the closed state before an actuation of the brake cylinder 16 occurs and/or before the hydraulic fluid is displaced in the direction of the wheel brake 28 by means of the brake cylinder 16.

Preferably, the control unit 48 is configured to utilize a signal with at least information regarding a present state of actuation of an accelerator pedal (not illustrated in FIG. 1) of the motor vehicle. Preferably, the control unit 48 is configured such that, if a generator braking force of the electric machine 50 is present or incipient, and if the accelerator pedal has been changed from an actuation position in the direction of a rest position and/or has been released, said control unit activates the opening device 82 to open the hydraulic connection 80, in particular activates the pressure dissipation valve 34 for adjustment in the direction away from the closed state, for example for adjustment in the direction of an open position, already before the hydraulic fluid is displaced in the direction of the wheel brake 28. The control unit 48 is preferably furthermore configured such that, if or as soon as the accelerator pedal has been released, said control unit switches over the electric machine 50 from a motor mode into the generator mode which effects the generator braking force.

Preferably, the control unit 48 is configured to utilize a signal with at least information regarding an actuation of the brake pedal 12 and/or a present state of actuation of the brake pedal 12 and/or a signal with at least information of the pedal travel sensor 46 for the brake pedal 12. Preferably, the control unit 48 is configured such that, if a generator braking force of the electric machine 50 is present or incipient, and if the brake pedal 12 has been actuated, said control unit activates the opening device 82 to open the hydraulic connection 80, in particular activates the pressure dissipation valve 34 for adjustment in the direction away from the closed state, for example for adjustment in the direction of an open position, before the hydraulic fluid is displaced in the direction of the wheel brake 28.

Preferably, the control unit 48 is configured to utilize a signal with information regarding a braking force demand, in particular a present braking force demand, for example to compare the braking force demand with the generator braking force, in particular the present generator braking force of the electric machine 50. Preferably, the control unit 48 is configured such that, if the braking force demand or the present braking force demand is higher than the generator braking force or the present generator braking force, said control unit activates the opening device 82 to close the hydraulic connection 80, in particular activates the pressure dissipation valve 34 to return in the direction of the closed state, in particular into the closed state. In this way, the gap between the provided braking force and the braking force demand can be closed.

The control unit 48 is preferably configured to utilize a signal with at least information regarding an actuation of the brake cylinder 16. Preferably, the control unit 48 is configured such that, if no actuation of the brake cylinder 16 and/or of the brake pedal 12 occurs over a predetermined waiting period, said control unit activates the opening device 82 to close the hydraulic connection 80, in particular activates the pressure dissipation valve 34 to return in the direction of the closed state, in particular into the closed state.

Preferably, the control unit 48 is configured to utilize a signal with at least information regarding the speed, in particular the present speed of the motor vehicle. Preferably, the control unit 48 is configured such that, if a standstill state of the motor vehicle has been identified, said control unit activates the opening device 82 so as to close, in particular activates the pressure dissipation valve 34 to return in the direction of the closed state, for example into the closed state.

Preferably, the control unit 48 is also configured such that, if the brake pedal 12 for the brake cylinder 16 is actuated with a speed higher than a predefined speed, said control unit activates the opening device 82 to close the hydraulic connection 80, in particular activates the pressure dissipation valve 34 to return in the direction of the closed state, for example into the closed state, and furthermore activates the pump 38 so as to impart a conveying action, in order to return a volume fraction of the hydraulic fluid, which has flowed out via the open opening device 82 or the open pressure dissipation valve 34, via the return line 32 back into the hydraulic connection 80 between the brake cylinder 16 and the wheel brake 28.

Before a regenerative braking process begins, the hydraulic brake system 10 is in an initial state. Preferably, in the initial state, the isolation valve 22 is in an open position (FIG. 1), such that the feed line 20 is open. Preferably, in the initial state, the opening device 82 is in a closed state, such that the hydraulic connection 80 between the brake cylinder 16 and the wheel brake 28 is closed, and thus an outflow of hydraulic fluid is prevented. It is preferably also the case in the initial state that the pressure dissipation valve 34 is in a closed state (FIG. 1), such that the return line 32 is closed or shut off. Preferably, in the initial state, no conveying of hydraulic fluid is performed by the pump 38. The accumulator 42 is preferably in a discharged or at least substantially discharged state (FIG. 1).

The hydraulic brake system 10 permits functioning as described below on the basis of the example of a motor vehicle equipped with the hydraulic brake system 10, wherein, by way of example, reference is made only to the one vehicle wheel 100 of FIG. 1:

The motor vehicle is performing a traveling movement, and a driver or a vehicle controller correspondingly actuates the accelerator pedal. For example, the driver or the vehicle controller holds the accelerator pedal constantly in the same actuation position, or the driver or the vehicle controller actuates the accelerator pedal in the direction of an actuation position which signals a desire for higher motor power. If the electric machine 50 is utilized as a drive for the traveling movement of the motor vehicle, the electric machine 50 is in a motor mode. Furthermore, the hydraulic brake system 10 is in the initial state described above.

If the driver or the vehicle controller now changes the accelerator pedal from the actuation position into the rest position, that is to say the accelerator pedal is released, this is identified by the control unit 48, and the opening device 82 is thereupon activated by the control unit 48 to open a hydraulic connection 80 between the brake cylinder 16 and the wheel brake 28 in order to allow an escape of hydraulic fluid from the hydraulic connection 80. This may be performed by virtue of the pressure dissipation valve 34 being activated by the control unit 48 for adjustment into an open position, whereby an opening of the return line 32 occurs. The opening of the hydraulic connection 80 or the adjustment of the pressure dissipation valve 34 into the open position or the one open position is performed at a time at which hydraulic fluid is not yet, or has not yet been, displaced in the direction of the wheel brake 28. For example, at this point in time, it is also the case that the brake cylinder 16 and/or the brake pedal 12 has not yet been, or is not yet, actuated.

For example, the opening of the hydraulic connection 80 or the adjustment of the pressure dissipation valve 34 into the open position or the one open position is performed only when the control unit 48 establishes or identifies that the electric machine 50 has been prepared for use as a generator, for example has been switched into the generator mode and thus a generator braking force is being imparted, or the generator mode is incipient. For this purpose, the control unit 48 may utilize the available information regarding the present pedal position or change in pedal position of the accelerator pedal.

If no actuation of the brake pedal 12 or of the brake cylinder 16 occurs within a predetermined waiting period, and/or if a standstill state of the motor vehicle has been identified, the hydraulic connection 80 is closed again by means of the opening device 82, or the return line 32 is closed again by means of the pressure dissipation valve 34.

If the driver or the vehicle controller now initiate a braking operation, for example by virtue of the brake pedal 12 and/or the brake cylinder 16 being actuated, a displacement of a hydraulic fluid from the brake cylinder 16 in the direction of the wheel brake 28 takes place. Owing to the already-open hydraulic connection 80 between the brake cylinder 16 and the wheel brake 28 or the open return line 32, at least one volume fraction of the hydraulic fluid flows out or is conducted into the accumulator 42 before reaching the wheel brake 28. This prevents the displacement of the hydraulic fluid in the wheel brake 28 from resulting in a build-up of a fluid pressure, which causes undesired contact of the friction lining of the wheel brake 28 against a counterpart friction surface, and thus a generation of an undesired rubbing moment which counteracts the recuperation action of the electric machine 50. By virtue of the fact that the hydraulic connection 80 has already been opened before the displacement of the hydraulic fluid, undesired contact of the friction lining of the wheel brake 28 against the counterpart friction surface resulting from a brief increase in the fluid pressure, for example a pressure pulse or pressure peak, is also prevented.

In other words, the hydraulic brake system 10 no longer waits until a braking operation has been identified before opening the hydraulic connection 80, but rather opens the hydraulic connection 80 already when readiness of the electric machine 50 for recuperation has been established, that is to say the electric machine 50 is in the generator mode or the generator mode is incipient.

By means of the actuation of the brake pedal 12 or of the brake cylinder 16, a braking force demand is input, which must be matched by generation of a braking force, for example of a braking force at the vehicle wheel 100. For this purpose, the drag torque originating from the electric machine 50 is utilized, which acts as a braking force on the moving system, that is to say in the present case on the motor vehicle or the vehicle wheel 100.

In the present open position of the pressure dissipation valve 34, the generator braking force effected by the electric machine 50 can, with rising braking force demand, basically be utilized until such time as the braking force limit of the electric machine 50 has been reached. Only then is a hydraulic braking force required or must a hydraulic braking force be increased. For example, this is then performed by means of an adjustment of the pressure dissipation valve 34 in the direction of a closed state. For this purpose, the pressure dissipation valve 34 is correspondingly activated by the control unit 48. Additionally, the control unit 48 may activate the pump 38 so as to impart a conveying action, whereby the outflow of at least a volume fraction of the hydraulic fluid from the accumulator 42 in the direction of the wheel brake 28 is effected or at least assisted. By means of the hydraulic braking force, it is then possible, together with the generator braking force, for an overall braking force to be provided which covers the braking force demand.

If the brake pedal 12 is actuated with a very high speed, it is for example the case that a safety routine is activated in order to prevent an undesired lengthening of the pedal travel. The control unit 48 identifies such an actuation of the brake pedal 12 for example by establishing, for example on the basis of the pedal travel sensor 46, that the brake pedal 12 is actuated with a speed higher than a predefined speed. In this case, the control unit 48 activates the opening device 82 to close the hydraulic connection 80 or the control unit 48 activates the pressure dissipation valve 34 to close the return line 32, and in addition to this the control unit 48 activates the pump 38 so as to impart a conveying action, in order to return that volume fraction of the hydraulic fluid which is flowed out, in particular that volume fraction of the hydraulic fluid which is situated in the accumulator 42, back into the hydraulic connection 80 or the feed line 20. This process preferably takes place as quickly as possible, for example already while the brake pedal 12 is being actuated.

Figure 2:
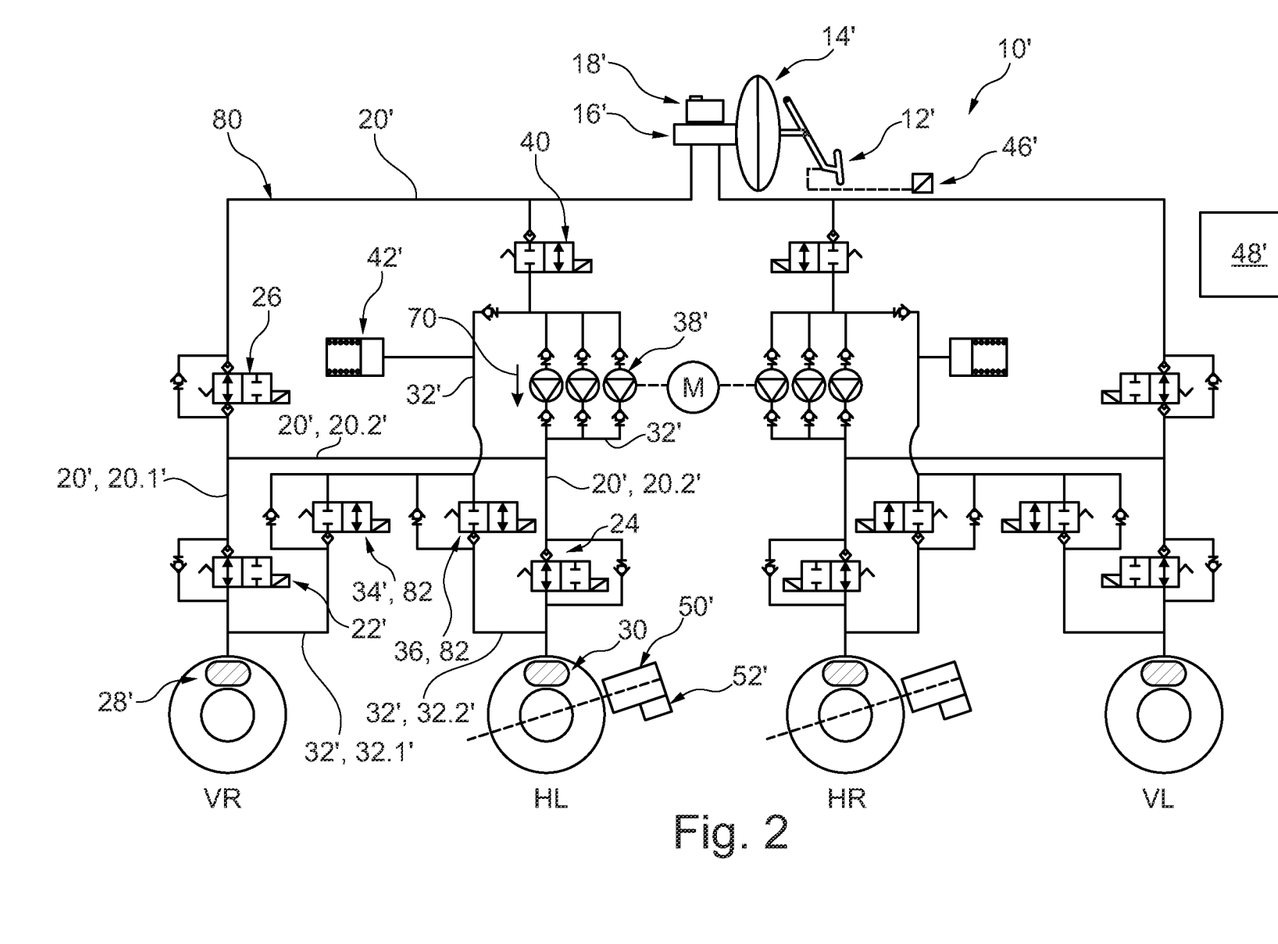
FIG. 2 shows a further possible embodiment of a hydraulic brake system, which is suitable for carrying out a regenerative braking process, in a schematic illustration.

FIG. 2 shows a further possible embodiment of a hydraulic brake system 10' which is suitable for performing a regenerative braking process and which may be used for example in a motor vehicle. In the hydraulic brake system 10', two hydraulically mutually separate brake circuits are provided. There are preferably interactions between the two brake circuits. For example, a pressure equalization takes place via a common brake cylinder 16', such that the same brake pressure prevails in both brake circuits. Below, only one of the brake circuits will be referred to, wherein the other brake circuit may be of identical and/or functionally identical construction. For the sake of simplicity and for better clarity, any signal lines that are present have been omitted in FIG. 2.

The hydraulic brake system 10' of FIG. 2 is such a brake system as described in WO 2014/082885 A1. In this respect, with regard to the construction and the functionality of the hydraulic brake system 10', reference is made to the disclosure of WO 2014/082885 A1, which is hereby incorporated in its entirety into the description.

The above-described components of the hydraulic brake system 10 of FIG. 1 may likewise be present in the hydraulic brake system 10'. The hydraulic brake system 10' comprises for example a brake pedal 12', a brake force booster 14', a brake cylinder 16', a reservoir 18', a feed line 20', an isolation valve 22', a wheel brake 28', a return line 32', a pressure dissipation valve 34', a pump 38', an accumulator 42', a pedal travel sensor 46', a control unit 48', an electric machine 50' and a control unit 52. These components may be structurally identical and/or functionally identical to the corresponding components of the hydraulic brake system 10 of FIG. 1.

For example, the brake pedal 12' may correspond and/or be structurally identical and/or functionally identical to the brake pedal 12, the brake force booster 14' may correspond and/or be structurally identical and/or functionally identical to the brake force booster 14, the brake cylinder 16' may correspond and/or be structurally identical and/or functionally identical to the brake cylinder 16, the reservoir 18' may correspond and/or be structurally identical and/or functionally identical to the reservoir 18, the feed line 20' may correspond and/or be structurally identical and/or functionally identical to the feed line 20, the isolation valve 22' may correspond and/or be structurally identical and/or functionally identical to the isolation valve 22, the wheel brake 28' may correspond and/or be structurally identical and/or functionally identical to the wheel brake 28, the return line 32' may correspond and/or be structurally identical and/or functionally identical to the return line 32, the pressure dissipation valve 34' may correspond and/or be structurally identical and/or functionally identical to the pressure dissipation valve 34, the pump 38' may correspond and/or be structurally identical and/or functionally identical to the pump 38, the accumulator 42' may correspond and/or be structurally identical and/or functionally identical to the accumulator 42, the pedal travel sensor 46' may correspond and/or be structurally identical and/or functionally identical to the pedal travel sensor 46, the control unit 48' may correspond and/or be structurally identical and/or functionally identical to the control unit 48, the electric machine 50' may correspond and/or be structurally identical and/or functionally identical to the electric machine 50, and the control unit 52' may correspond and/or be structurally identical and/or functionally identical to the control unit 52, of the hydraulic brake system 10 of FIG. 1. In this respect, reference is made to the description relating to the hydraulic brake system 10 of FIG. 1.

FIG. 2 illustrates four vehicle wheels, which are each assigned a wheel brake. The brake circuit under consideration comprises not only the wheel brake 28' but also a further wheel brake 30, which is assigned to a different vehicle wheel. The two vehicle wheels with the associated wheel brakes 28' and 30 may be present at a common axle or may be assigned to different axles, for example to the front axle and to the rear axle of a motor vehicle. FIG. 2 shows, by way of example, an assignment of the vehicle wheels to the front axle and to the rear axle in a diagonal configuration, wherein VR denotes the front right vehicle wheel, VL denotes the front left vehicle wheel, HR denotes the rear right vehicle wheel, and HL denotes the rear left vehicle wheel. By way of example, in FIG. 2, the electric machine 50' is assigned to the rear axle. The electric machine 50' interacts with the vehicle wheel at the rear left. For example, a further electric machine may be provided which interacts with the vehicle wheel at the rear right. It is also possible for the rear axle to be assigned an electric machine which is common to both vehicle wheels.

The two wheel brakes 28' and 30 are jointly hydraulically connected to the feed line 20', wherein, at one end, the brake cylinder 16' is present and, at another end, the feed line 20' divides into two line portions 20.1' and 20.2', which are in each case hydraulically connected to one of the wheel brakes 28' and 30. The line portion 20.1' is assigned the isolation valve 22', and the line portion 20.2' is assigned a separate isolation valve 24. The isolation valves 22' and 24 are preferably structurally identical and/or functionally identical with respect to one another.

The return line 32 provided in the case of the hydraulic brake system 10 of FIG. 1 at least partially corresponds to the return line 32', which is assigned the pump 38' and the accumulator 42'. As viewed in the direction of the wheel brakes 28' and 30, the return line 32' divides into two line portions 32.1' and 32.2', which are in each case hydraulically connected to one of the wheel brakes 28' and 30. Aside from the pressure dissipation valve 34', a further pressure dissipation valve 36 is provided, which are assigned in each case to one of the line portions 32.1', 32.2' of the return line 32'. By means of the isolation valves 22' and 24, each of the two wheel brakes 28' and 30 can be separately hydraulically isolated. By means of the pressure dissipation valves 34' and 36, it is possible, separately for each of the two wheel brakes 28' and 30, for a volume fraction of a hydraulic fluid displaced by means of the brake cylinder 16 to be conducted onward in the associated line portion 32.1', 32.2' of the return line 32' in order to be stored in the accumulator 42'.

Preferably, the control unit 48' is of extended functional scope in relation to the control unit 48 of the hydraulic brake system 10 in FIG. 1 such that, aside from the isolation valve 22' and the pressure dissipation valve 34', which are assigned to the wheel brake 28', it is additionally also possible for the isolation valve 24 and the pressure dissipation valve 36, which are assigned to the wheel brake 30 to be activated. The isolation valve 24 and the pressure dissipation valve 36 are preferably activatable by the control unit 48 in the same way as the isolation valve 22' and the pressure dissipation valve 34'. For example, the isolation valves 22', 24 and the pressure dissipation valves 34', 36 are a constituent part of an anti-lock braking system which is provided by means of the hydraulic brake system 10'. For example, the control unit 48' is additionally configured for executing the hydraulic brake system 10' during an anti-lock braking process.

As regards the regenerative braking process described with reference to FIG. 1, with regard to the embodiment of FIG. 2, a distinction is to be made between the rear vehicle wheels HL, HR and the front vehicle wheels VL, VR and the respectively assigned wheel brakes, wherein, for the sake of simplicity, only the vehicle wheel VR and the vehicle wheel HL and the assigned wheel brakes 28', 30 will be considered below.

In the case of the hydraulic brake system 10' of FIG. 2, the functions of the hydraulic brake system 10 of FIG. 1, as have been described above, are preferably implemented at the front vehicle wheels VL, VR and the assigned wheel brakes. The pressure dissipation valve 36, which is assigned to the wheel brake 30 at the rear vehicle wheel HL, preferably remains in a closed state.

As can be seen from FIG. 2, the feed line 20' may be assigned a further isolation valve 26, which is arranged in the feed line between the division into the line portions 20.1', 20.1' and the brake cylinder 16. Furthermore, a supply valve 40 may be assigned to the return line 32'. By means of the supply valve 40, the return line 32' can be hydraulically connected, bypassing the further isolation valve 26, to a region positioned upstream of said isolation valve 26. For example, the isolation valve 26 and the supply valve 40 are a constituent part of a driving dynamics control system (ESP). For example, the control unit 48' is additionally configured for executing the hydraulic brake system 10' during a driving dynamics control process.

In the present description, the expression "isolation valve" is to be understood in particular to mean a shut-off element by means of which the wheel brake can be at least partially hydraulically decoupled, that is to say isolated, from the brake cylinder. In particular, the isolation valve is configured to close and open the feed line. In particular, the isolation valve is configured to completely close or at least partially close the feed line. For example, the isolation valve has a passage for fluid, in particular the hydraulic fluid, which passage is of variable cross section. For example, the isolation valve is configured to be adjusted between a closed position and an open position, for example with regard to the passage, wherein, in the closed position, the feed line is at least partially or completely closed, that is to say shut off. In the "closed state" described above, the isolation valve is situated for example in the closed position. If the isolation valve is adjusted in a direction away from the closed state, it is for example the case that the cross section of the passage is increased in size. If the isolation valve is adjusted in a direction toward the closed state, it is for example the case that the cross section of the passage is decreased in size.

For example, the isolation valve is configured to be electrically and/or electromagnetically actuated, in particular in order to be adjusted and/or switched, for example adjusted and/or switched in continuously variable or stepped and/or digital or analog fashion, between the closed position and the open position. For example, the isolation valve is or comprises a 2/2 directional valve, which, for example, assumes the open position in a non-actuated state and the closed position in an actuated state. If it is an electrically or electromagnetically actuated isolation valve, it is for example electrically deenergized in the non-actuated state and electrically energized in the actuated state. For example, the isolation valve is a valve with an NO function. The NO function is to be understood in particular to mean that the valve is open in the electrically deenergized state. Such a valve may also be referred to as a "normally open" NO valve. For example, the isolation valve is a preferably directly controlled solenoid valve with an NO function.

In the present description, the expression "pressure dissipation valve" is to be understood in particular to mean a shut-off element by means of which the return line can be at least partially or fully opened, for example proceeding from a shut-off state. For example, the pressure dissipation valve has a passage for fluid, in particular the hydraulic fluid, which passage is of variable cross section. For example, the pressure dissipation valve is configured to be adjusted between a closed position and an open position, for example with regard to the passage, wherein, in the open position, the return line is at least partially or completely opened. In the "closed state" described above, the pressure dissipation valve is situated for example in the closed position. If the pressure dissipation valve is adjusted in a direction away from the closed state, it is for example the case that the cross section of the passage is increased in size. If the pressure dissipation valve is adjusted in a direction toward the closed state, it is for example the case that the cross section of the passage is decreased in size.

For example, the pressure dissipation valve is configured to be electrically or electromagnetically actuated, in order to be adjusted and/or switched, for example adjusted and/or switched in continuously variable or stepped and/or digital or analog fashion, between the closed position and the open position. For example, the pressure dissipation valve is or comprises a 2/2 directional valve, which, for example, assumes the closed position in a non-actuated state and the open position in an actuated state. If it is an electrically or electromagnetically actuated pressure dissipation valve, it is for example electrically deenergized in the non-actuated state and electrically energized in the actuated state. For example, the pressure dissipation valve is a valve with an NC function. The NC function is to be understood in particular to mean that the valve is closed in the electrically deenergized state. Such a valve may also be referred to as a "normally closed" NC valve. For example, the pressure dissipation valve is a preferably directly controlled solenoid valve with an NC function.

In the present description, the reference to a particular aspect or a particular embodiment or a particular refinement means that a particular feature or a particular characteristic described in conjunction with the respective aspect or the respective embodiment or the respective refinement is comprised at least therein but need not necessarily be comprised in all aspects or embodiments or refinements of the invention. It is expressly pointed out that any combination of the various features and/or structures and/or characteristics described with regard to the invention are encompassed by the invention unless this is expressly or positively ruled out by the context.

The use of individual or all examples or of an exemplary phrasing in the text is intended merely to illustrate the invention and does not constitute a limitation with regard to the scope of the invention, unless stated otherwise. Also, no phrasing or wording of the description is to be understood as referring to an element which is not claimed but which is essential for the practical implementation of the invention.

REFERENCE SIGNS 10, 10' Brake system
12, 12' Brake pedal
14, 14' Brake force booster
16, 16' Brake cylinder
18, 18' Reservoir
20, 20' Feed line
20.1' Line portion
20.2' Line portion
22, 22' Isolation valve
24 Isolation valve
26 Isolation valve
28, 28' Wheel brake
30 Wheel brake
32, 32' Return line
32.1' Line portion
32.2' Line portion
34, 34' Pressure dissipation valve
36 Pressure dissipation valve
38, 38' Pump
40 Supply valve
42, 42' Store
46, 46' Pedal travel sensor
48, 48' Control unit
50, 50' Electric machine
52, 52' Control unit
54 Check valve
56 Check valve
60 Signal line
61 Signal line
62 Signal line
63 Signal line
64 Signal line
65 Actuation connection
70 Return direction
72 Actuator
74 Actuator
76 Region positioned upstream
78 Region positioned downstream
80 Hydraulic connection
82 Opening device
M Drive motor
100 Vehicle wheel
VR Front right
VL Front left
HR Rear right
HL Rear left

What is claimed is:

1. A method for operating a hydraulic brake system (10) in a motor vehicle with regenerative braking function comprising:
   opening a pressure dissipation valve (34) in a return line (32) for a hydraulic connection (80) between a brake cylinder (16) and a wheel brake (28) following an electric machine (50) being switched from a motor mode to a generator mode and before a hydraulic fluid is displaced in the direction of the wheel brake (28) by the brake cylinder (16); and then
   closing the pressure dissipation valve (34) in the return line (32) once the brake cylinder (16) remains unactuated over a predetermined waiting period.

2. The method as claimed in claim 1, wherein the step of opening the pressure dissipation valve (34) in the return line (32) for the hydraulic connection (80) between the brake cylinder (16) and the wheel brake (28) comprises opening the pressure dissipation valve (34) before a hydraulic fluid is displaced in the direction of the wheel brake (28) by the brake cylinder (16) and in response to an accelerator pedal of the motor vehicle being changed from an actuation position in the direction of a rest position.

3. The method as claimed in claim 1, wherein the step of opening the pressure dissipation valve (34) in the return line (32) for the hydraulic connection (80) between the brake cylinder (16) and the wheel brake (28) comprises opening the pressure dissipation valve (34) before a hydraulic fluid is displaced in the direction of the wheel brake (28) by the brake cylinder (16) and in response to an accelerator pedal of the motor vehicle being released.

4. The method as claimed in claim 1, wherein the step of opening the pressure dissipation valve (34) in the return line (32) for the hydraulic connection (80) between the brake cylinder (16) and the wheel brake (28) comprises immediately opening the pressure dissipation valve (34) as soon as an accelerator pedal has been released and before a hydraulic fluid is displaced in the direction of the wheel brake (28) by the brake cylinder (16).

5. The method as claimed in claim 1, wherein the step of opening the pressure dissipation valve (34) in the return line (32) for the hydraulic connection (80) between the brake cylinder (16) and the wheel brake (28) comprises opening the pressure dissipation valve (34) before a hydraulic fluid is displaced in the direction of the wheel brake (28) by the brake cylinder (16) and in response to a brake pedal (12) associated with the brake cylinder (16) being actuated.

6. The method as claimed in claim 1, further comprising closing the pressure dissipation valve (34) in response to a braking force demand being higher than a generator braking force of the electric machine (50).

7. The method as claimed in claim 1, further comprising closing the pressure dissipation valve (34) and activating a pump (38) in response to actuating a brake pedal (12) for the brake cylinder (16) with a speed higher than a predefined speed in order to return a volume fraction of the hydraulic fluid, which has flowed out of the hydraulic connection (80) through the return line (32), back into the hydraulic connection (80).

8. A method for operating a hydraulic brake system (10) in a motor vehicle with regenerative braking function comprising:
  opening a pressure dissipation valve (34) in a return line (32) for a hydraulic connection (80) between a brake cylinder (16) and a wheel brake (28) following an electric machine (50) being switched from a motor mode to a generator mode and before a hydraulic fluid is displaced in the direction of the wheel brake (28) by the brake cylinder (16); and then
  closing the pressure dissipation valve (34) in response to identifying a standstill state of the motor vehicle.

9. A hydraulic brake system (10) for a motor vehicle with regenerative braking function, comprising:
  a brake cylinder (16) and a wheel brake (28) which have a hydraulic connection (80) to one another, wherein the brake cylinder (16) is configured to displace a hydraulic fluid in the direction of the wheel brake (28), and the wheel brake (28) is configured to impart a hydraulic braking force with the hydraulic fluid;
  an opening device (82) for opening a return line (32) for the hydraulic connection (80);
  a pump (38) and an accumulator (42) fluidically assigned to the return line (32), the accumulator (42) being configured to store at least one volume fraction of the hydraulic fluid, and the pump (48) being configured to convey at least one volume fraction of the hydraulic fluid; and
  a control unit (48) for activating the opening device (82), wherein the control unit (48) is configured to utilize a signal with information regarding a presence or onset of a generator braking force of an electric machine (50), and wherein the control unit (48) is configured to activate the opening device (82) to open the return line (32) for the hydraulic connection (80) before the hydraulic fluid is displaced in the direction of the wheel brake (28) and following the generator being switched from a motor mode to a generator mode,
  the control unit (48) also being configured to close the opening device (82) and activate the pump (38) so as to impart a conveying action in order to return a volume fraction of the hydraulic fluid, which has flowed out of the hydraulic connection (80) through the opening device (82), via the return line (32) back into the hydraulic connection (80) between the brake cylinder (16) and the wheel brake (28) in response to a brake pedal (12) for the brake cylinder (16) being actuated with a speed higher than a predefined speed.

10. The brake system as claimed in claim 9,
  wherein the control unit (48) is configured to utilize a signal with information regarding a present state of actuation of an accelerator pedal of the motor vehicle, and
  wherein the control unit (48) is configured to activate the opening device (82) to open the return line (32) of the hydraulic connection (80) before the hydraulic fluid is displaced in the direction of the wheel brake (28) and in response to an accelerator pedal of the motor vehicle being released and/or changed from an actuation position in the direction of a rest position.

11. The brake system as claimed in claim 9,
  wherein the control unit (48) is configured to utilize a signal with information regarding a present state of actuation of an accelerator pedal of the motor vehicle, and
  wherein the control unit (48) is configured to switch over the electric machine (50) from the motor mode into the generator mode which effects the generator braking force in response to the accelerator pedal being released.

12. The brake system as claimed in claim 9,
  wherein the control unit (48) is configured to close the opening device (82) in response to a braking force demand being higher than a generator braking force of the electric machine (50), or in response to no actuation of the brake cylinder (16) occurring over a predetermined waiting period, or in response to identifying a standstill state of the motor vehicle.

13. The brake system as claimed in claim 9, wherein the opening device (82) is a pressure dissipation valve (34).

* * * * *